March 4, 1941.    C. E. NORTON    2,233,708
AUTOMOBILE WINDSHIELD
Filed May 6, 1940    2 Sheets-Sheet 1

Inventor.
Charles E. Norton
By
Williams, Bradbury & Hinkle
Attys.

March 4, 1941.   C. E. NORTON   2,233,708
AUTOMOBILE WINDSHIELD
Filed May 6, 1940   2 Sheets-Sheet 2

Inventor
Charles F. Norton
By
Williams, Bradbury & Hinkle
Attys.

Patented Mar. 4, 1941

2,233,708

UNITED STATES PATENT OFFICE 2,233,708

AUTOMOBILE WINDSHIELD

Charles E. Norton, Evanston, Ill.

Application May 6, 1940, Serial No. 333,496

1 Claim. (Cl. 296—84)

My invention relates generally to automobile windshields.

A large majority of the windshields used upon automobiles, are of the so called "divided" construction, in order to conform generally to the streamlined body shape and to afford a wider field of vision for the occupants of the vehicle. Such windshield construction, however, has the pronounced disadvantage that a center mullion is required. Even though this mullion is made very narrow, it still has a distracting effect upon the driver of the vehicle, and interferes with his view of the road to some extent.

It is therefore an object of my invention to provide an improved windshield construction in which it is unnecessary to provide a mullion, and in which the advantages of the divided windshield construction, are retained.

A further object is to provide an improved windshield for automotive vehicles, which is strong, which conforms to the streamlined body, which affords a wide field of view for the occupants of the vehicle, which is free from undesirable reflections, and to which a windshield wiper may be readily adapted.

Figure 1:
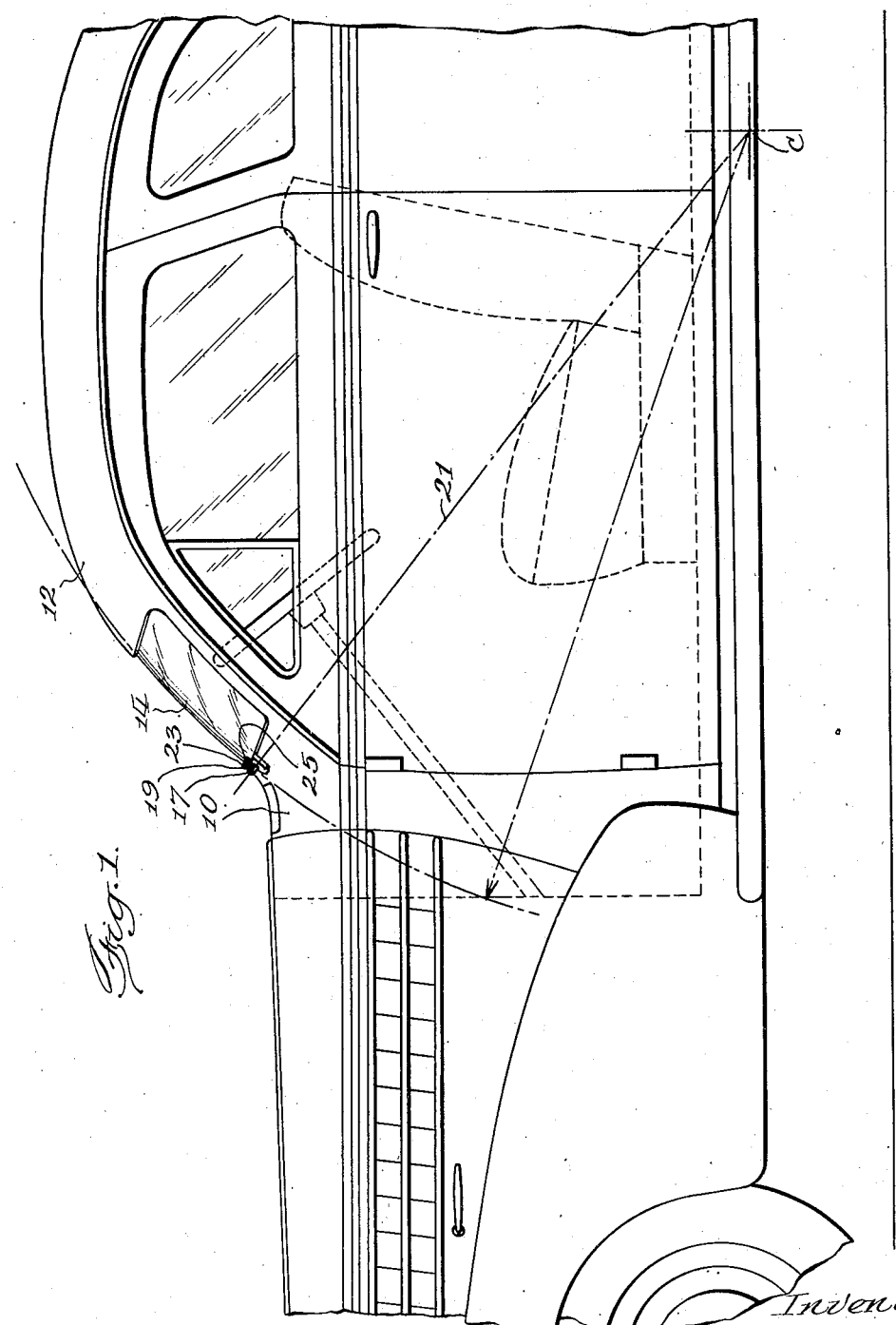
Figure 2:
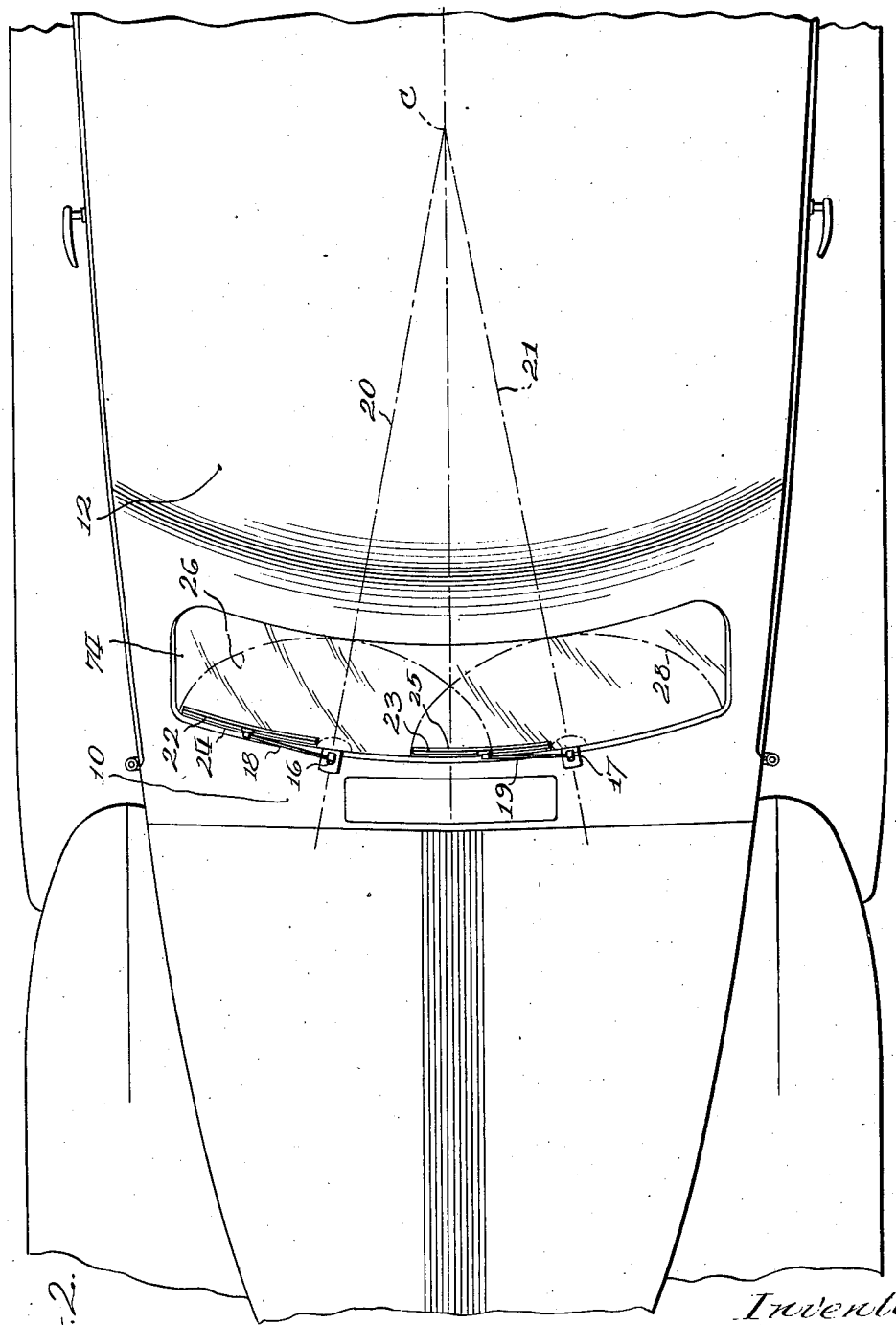

Other objects will appear from the following description, reference being had to the accompanying drawings, in which Fig. 1 is a fragmentary side elevational view of an automobile incorporating the improved windshield, and Fig. 2 is a plan view thereof.

It has been proposed to utilize windshields having the conformation of a portion of a cylinder in order to obtain some of the advantages above set forth, but such suggestions have not met with favor, due to the difficulty of adapting a windshield wiper of the common oscillating type to windshields of such shape. To overcome this objection, the windshield of my invention is of spherical conformation, so that a windshield wiper of standard construction, except for the shape of the squeegee, may be used.

In the accompanying drawings, the windshield of my invention is shown as part of a sedan type automobile, having a cowl portion 10 and a top 12. The windshield 14 is preferably fixedly secured in the body in the usual manner. The windshield 14 may be made of so called safety glass, or any other suitable material, its distinguishing characteristic being that it is in the form of a portion of the surface of a relatively large sphere. In the drawings, the windshield is shown as having a radius of curvature of five to six feet, the center curvature C being located in the medial, longitudinal plane of the vehicle, at approximately the level of the floor of the vehicle, or about three and one-half feet below the lower edge of the windshield.

The lower edge of the windshield 14 may lie in a horizontal plane, or the central portion of the lower edge may be slightly higher than the ends of the windshield, as shown in the drawings. The upper edge of the windshield is preferably made parallel to the lower edge. The side edges of the windshield may be substantially parallel, as illustrated, or may slope toward each other so that the windshield is somewhat wider at its lower edge than at its top edge.

Since the center of the curvature of the windshield is a substantial distance below the normal eye level of occupants of the vehicle, there will be very little possibility of light reflection from the windshield surface, which would be annoying to the occupants. Due to its spherical conformation, the windshield 14 will be stronger than a plane windshield of equivalent area and thickness.

The windshield wipers used with the windshield may have conventional operating mechanisms, including oscillatory shafts 16 and 17 to which the wiper arms 18 and 19 are secured. The axes of the shafts 16 and 17 extend radially with respect to the windshield surface, as indicated by the dot-dash lines 20 and 21, respectively. Because of this fact, the squeegees 22, 23, and their holders 24, 25, are shaped to conform to the surface of the windshield, that is, the wiping edge is curved to the same radius of curvature as that of the windshield, and therefore as the wipers are operated, the edges of the squeegees will be maintained in wiping contact with the surface of the windshield throughout their entire range of oscillation.

The wipers are preferably arranged to oscillate in synchronism, so that the areas wiped thereby may overlap, as indicated by the dot-dash lines 26, 28 in Fig. 2. Thus a very large proportion of the area of the windshield is kept clean by the wipers.

It will thus be seen that the spherically shaped windshield has many advantages, not only in that it conforms more closely to the streamlined body shape of the vehicle than do ordinary divided windshields, but also that it affords a greater visibility, greater freedom from glaring reflections, and in addition is of a shape to which windshield wipers of substantially conventional construction may readily be adapted.

While I have shown and described a particular form of my invention, it will be apparent to those skilled in the art that the dimensions set forth in the foregoing description, and the details of the shape of the windshield, excepting its sphericity, are not essential, and may be varied to adapt the windshield to different body designs.

I claim:

In an automobile having a body, an integral windshield forming part of said body and comprising a transparent sheet shaped to conform to the surface of a portion of a sphere having its center of curvature located in the longitudinal median plane of the body and at a substantial distance below the normal level of the eyes of a person seated in the automobile.

CHARLES E. NORTON.